(12) United States Patent
Joo et al.

(10) Patent No.: US 12,275,250 B2
(45) Date of Patent: Apr. 15, 2025

(54) PRINTING METHOD AND PRINTING APPARATUS FOR IMPROVING VISIBILITY AND PRINTED MATTER PRINTED USING THE PRINTING METHOD

(71) Applicant: SOCIÉTÉ BIC, Clichy (FR)

(72) Inventors: Jae Hyun Joo, Clichy (FR); Yu Jin Choi, Clichy (FR); Bo Seung Jang, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 153 days.

(21) Appl. No.: 17/997,952

(22) PCT Filed: May 7, 2021

(86) PCT No.: PCT/EP2021/062175
§ 371 (c)(1),
(2) Date: Nov. 4, 2022

(87) PCT Pub. No.: WO2021/224465
PCT Pub. Date: Nov. 11, 2021

(65) Prior Publication Data
US 2023/0173812 A1 Jun. 8, 2023

(30) Foreign Application Priority Data
May 7, 2020 (KR) .......................... 10-2020-0054773

(51) Int. Cl.
*B43K 5/02* (2006.01)
*B41J 2/175* (2006.01)
(Continued)

(52) U.S. Cl.
CPC ............. *B41J 2/17503* (2013.01); *B41J 2/21* (2013.01); *B41J 2/385* (2013.01); *B41M 3/008* (2013.01);
(Continued)

(58) Field of Classification Search
CPC .......... B41J 2/17503; B41J 2/21; B41J 2/385; B41M 3/008; B43K 5/025; B43K 8/22; B43K 5/1818; C09D 11/50; C08K 9/10
See application file for complete search history.

(56) References Cited

U.S. PATENT DOCUMENTS

2006/0092254 A1 5/2006 Claes et al.
2007/0274761 A1* 11/2007 Shim ...................... B43K 23/08
401/29

FOREIGN PATENT DOCUMENTS

EP 3015280 A2 5/2016
EP 3594004 A1 1/2020
(Continued)

OTHER PUBLICATIONS

International Serach Report issued in International Application No. PCT/EP2021/062175 on Apr. 8, 2021 (10 pages).

*Primary Examiner* — Yaovi M Ameh
(74) *Attorney, Agent, or Firm* — Bookoff McAndrews, PLLC (57) ABSTRACT

There are provided a printing method and a printing apparatus for increasing visibility and printed matter printed using the printing method. The printing apparatus sprays a light-absorbing composition to form a light-absorbing layer on a print medium, and then sprays a color-variable composition on the light-absorbing layer to form a color-variable layer.

13 Claims, 4 Drawing Sheets

(51) Int. Cl.
  *B41J 2/21* (2006.01)
  *B41J 2/385* (2006.01)
  *B41M 3/00* (2006.01)
  *B43K 8/22* (2006.01)
  *C09D 11/50* (2014.01)
  *B43K 5/18* (2006.01)
  *C08K 9/10* (2006.01)

(52) U.S. Cl.
  CPC ............... *B43K 5/025* (2013.01); *B43K 8/22* (2013.01); *C09D 11/50* (2013.01); *B43K 5/1818* (2013.01); *C08K 9/10* (2013.01)

(56) References Cited

FOREIGN PATENT DOCUMENTS

| | | | | | |
|---|---|---|---|---|---|
| JP | 2009072688 | A | * | 4/2009 | ............. B01J 19/26 |
| JP | 2011201151 | A | * | 10/2011 | ................ B41J 2/21 |
| JP | 2013220582 | A | * | 10/2013 | ............. B41M 3/14 |
| KR | 20050061315 | A | | 6/2005 | |
| KR | 1020120110565 | A | | 10/2012 | |
| KR | 1020160014220 | A | | 2/2016 | |
| KR | 1020170064917 | A | | 6/2017 | |
| KR | 1020180119862 | A | | 11/2018 | |
| KR | 1020190022291 | A | | 3/2019 | |
| WO | 2007045580 | A1 | | 4/2007 | |
| WO | 2007113743 | A1 | | 10/2007 | |
| WO | WO-2019193169 | A1 | * | 10/2019 | ............. A45D 40/20 |
| WO | 2019235707 | A1 | | 12/2019 | |
| WO | 2019238855 | A1 | | 12/2019 | |

\* cited by examiner

PRINTING METHOD AND PRINTING APPARATUS FOR IMPROVING VISIBILITY AND PRINTED MATTER PRINTED USING THE PRINTING METHOD

CROSS-REFERENCE TO RELATED APPLICATION(S)

This application is a National Stage Application of International Application No. PCT/EP2021/062175, filed on May 7, 2021, now published as WO2021224465 and which claims priority from Korean Patent Application No. 10-2020-0054773, filed on May 7, 2020, the entire contents of the '773 application which is incorporated herein by reference.

BACKGROUND

1. Field

One or more embodiments relate to a printing apparatus and a printing method, and more particularly, to a printing apparatus and a printing method, which are capable of increasing visibility, and a printed matter printed using the printing method.

2. Description of Related Art

In general, when a color is to be printed on a print medium, inks or toners containing pigments of various basic colors are appropriately mixed and applied or adsorbed on the print medium. In other words, a plurality of basic color cartridges such as red, green, blue, and black are required to express various colors.

SUMMARY

One or more embodiments include a printing apparatus, which is capable of printing a plurality of colors by using a single cartridge and capable of suppressing light reflected from a print medium and increasing visibility, a printing method using the printing apparatus, and a printed matter printed using the printing apparatus or the printing method.

Additional aspects will be set forth in part in the description which follows and, in part, will be apparent from the description, or may be learned by practice of the presented embodiments of the disclosure.

According to one or more embodiments, a printing apparatus includes: a first cartridge including a light-absorbing composition; a second cartridge including a color-variable composition; a first discharger that is configured to discharge the light-absorbing composition in the first cartridge; and a second discharger that is configured to discharge the color-variable composition included in the second cartridge.

According to one or more embodiments, a printing method using a printing apparatus includes: spraying a light-absorbing composition to form a light-absorbing layer on a print medium; and spraying a color-variable composition on the light-absorbing layer to form a color-variable layer.

According to one or more embodiments, a printed matter includes: a print medium; a light-absorbing layer including a light-absorbing material on the print medium; and a color-variable layer including a color-variable composition on the light-absorbing layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments. Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a printing apparatus, a printing method, and a printed matter according to embodiments will be described in detail with reference to the accompanying drawings.

Figure 1:
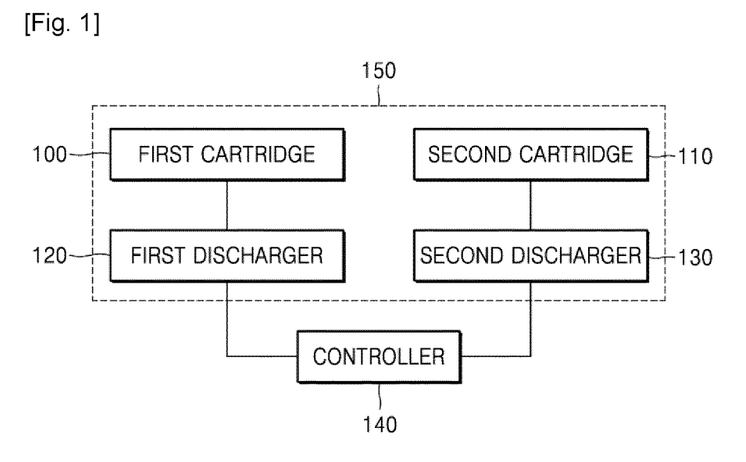
FIG. 1 is a view showing the configuration of a printing apparatus according to an embodiment of the disclosure.

FIG. 1 is a view showing the configuration of a printing apparatus according to an embodiment of the disclosure.

Figure 7:
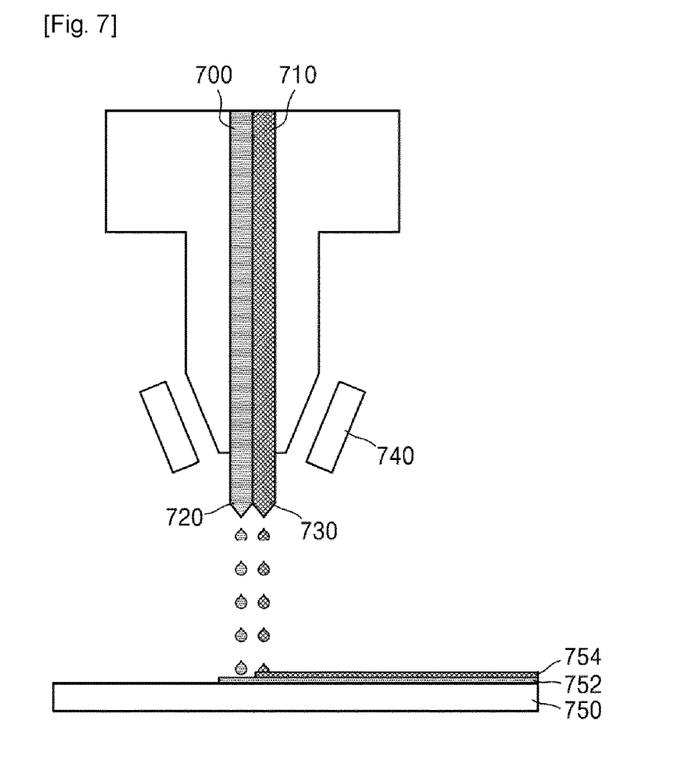
FIG. 7 is a view showing an example of a printer head in which a printing apparatus according to an embodiment of the disclosure is implemented.
Figure 8:
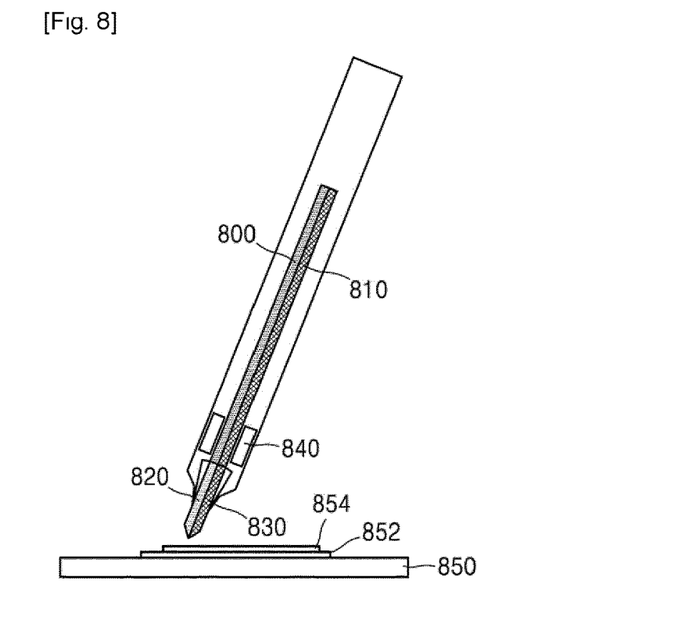
FIG. 8 is a view showing an example of a pen in which a printing apparatus according to an embodiment of the disclosure is implemented.

Referring to FIG. 1, the printing apparatus includes a first cartridge 100, a second cartridge 110, a first discharger 120, a second discharger 130, and a controller 140. According to an embodiment, it is also possible to implement the printing apparatus 150 in which the controller 140 is omitted. The printing apparatus may be implemented in various forms according to embodiments, such as a printer (for example, an inkjet printer type or a three-dimensional (3D) printer) or a pen type. An example in which the printing apparatus is implemented as a part of a printer head is shown in FIG. 7, and an example in which the printing apparatus is implemented in the form of a pen is shown in FIG. 8.

The first cartridge 100 includes a light-absorbing composition. The light-absorbing composition may include pigments of various colors capable of absorbing light. For example, the light-absorbing composition may include a black (or black-based) pigment to increase light absorption. In addition, the light-absorbing composition may include any one of an oil-based material, an aqueous material, and a neutral material, or a combination thereof. The oil-based material is not particularly limited and may include a organic liquid capable of dissolving or suspending the black pigment. In this context, it should be noted that the term "pigment" should be broadly construed to refer to both pigments, dyes and pigments coated with dyes. The use of pigments may be particularly advantageous. The aqueous material is not particularly limited and may include water as a solvent or suspension medium or an aqueous solution/suspension medium comprising a mixture of water and an organic liquid. The neutral material is also not particularly limited and includes any material that is neither miscible with the aqueous material and the oil-based material. It may also refer to a medium which is non-reactive towards the pigment.

For example, the light-absorbing composition may include a mixed organic pigment composition that is blackened by mixing an organic pigment with a black pigment such as carbon black, aniline black, iron oxide black, titanium oxide or chromium. As another example, the light-absorbing composition may include a polymer composition composed of a mixture of black dyes. Examples of the polymer composition include food black dyes such as C.I. Food Black 1 and C.I. Food Black 2, naphthol black direct azo dyes such as C.I. Direct Black 9, C.I. Direct Black 18, C.I. Direct Black 28, C.I. Direct Black 51, C.I. Direct Black 60, C.I. Direct Black 102, C.I. Direct Black 107, C.I. Direct Black 122, C.I. Direct Black 142, C.I. Direct Black 154, and C.I. Direct Black 168, and acid azo dyes such as C.I. Acid Black 2, C.I Acid Black 31, C.I. Acid Black 52, C.I. Acid Black 140, and C.I. Acid Black 187. The second cartridge 110 includes a color-variable composition. The color-variable composition is a composition including microcapsules whose color varies depending on the direction or intensity of a magnetic or electric field. Such color-variable compositions are known form e.g. WO 2019/193169 A1, the contents of which are incorporated herein in their entirety by reference thereto. The color-variable composition will be described again in FIGS. 3 and 4.

The first discharger 120 discharges the light-absorbing composition of the first cartridge 100, and the second discharger 130 discharges the color-variable composition of the second cartridge. The first discharger 120 and the second discharger 130 may be implemented in various conventional nozzle shapes.

Figure 2:
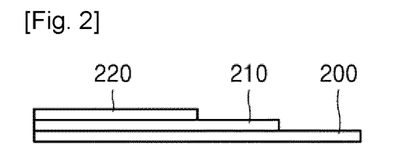
FIG. 2 is a view showing an example of a cross-section of printed matter printed by a printing method according to an embodiment of the disclosure.

The first discharger 120 and the second discharger 130 may be arranged in parallel. For example, when the printing apparatus according to the present embodiment is implemented as a part of the printer head as shown in FIG. 7, the first discharger 120 may be located in front of the second discharger 130 based on the direction of travel of the printer head. In this case, when the first discharger 120 and the second discharger 130 discharge a light-absorbing composition and a color-variable composition, respectively, as the printer head moves, a color-variable layer 220 including a color-variable composition is formed on a light-absorbing layer 210 including a light-absorbing composition, as shown in FIG. 2.

In another embodiment, a plurality of first dischargers 120 may be provided around the second discharger 130. For example, in the example of FIG. 7, when the printer head performs a print operation while moving in left and right directions, the first dischargers 120 may be present on the left and right sides of the second discharger 130, respectively. For example, a first-first discharger and a first-second discharger, which are connected to the first cartridge 100, may be located on the left and right sides of the second discharger 130, respectively, and the controller 140 may perform a control operation to output a light-absorbing composition through the first-first discharger or the first-second discharger according to the travelling direction of the printer head.

In another embodiment, when the printer head performs a print operation while moving in vertical and horizontal directions, the first dischargers 120 may be located on the upper and lower sides and left and right sides of the second discharger 130, respectively. That is, a first-first discharger, a first-second discharger, a first-third discharger, and a first-fourth discharger, which are connected to the first cartridge 100, may be located on the upper and lower sides and left and right sides of the second discharger 130, respectively, and the controller 140 may output a light-absorbing composition through any one of the first-first to first-fourth dischargers according to the travelling direction of the printer head.

Figure 9:
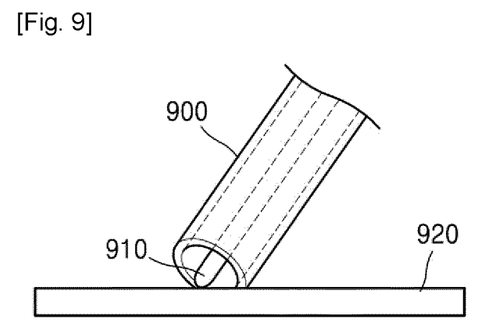
FIG. 9 is a view showing an example of the configuration of a discharger according to an embodiment of the disclosure.

As another embodiment, the first discharger 120 may have a form surrounding the second discharger 130. For example, when the printing apparatus is implemented in the form of a pen as shown in FIG. 8, a first discharger 900 may be located around a second discharger 910, as shown in FIG. 9, and thus a light-absorbing composition through the first discharger 120 (i.e., the first discharger 900) may be first output to a print medium even when a user holds and uses the pen in any direction. This will be described again with reference to FIGS. 8 and 9.

Depending on embodiments, the printing apparatus may omit or include the controller 140. Hereinafter, for convenience of description, the printing apparatus will be described on the assumption that the printing apparatus includes a controller.

Figure 5:
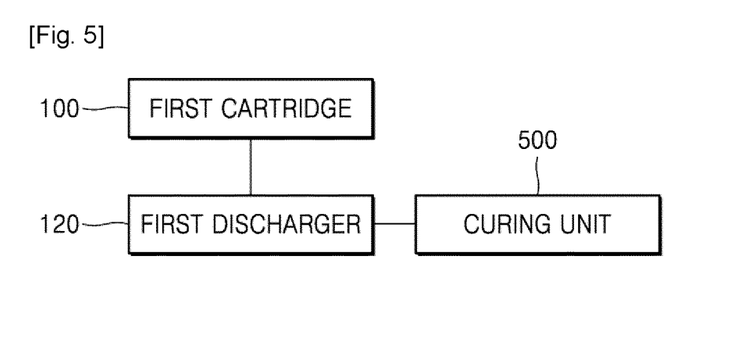
FIG. 5 is a view showing the configuration of a printing apparatus according to another embodiment of the disclosure.
Figure 6:
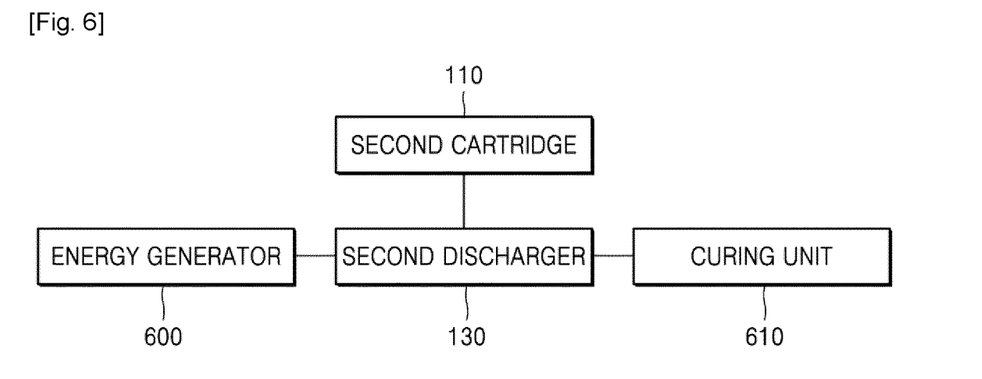
FIG. 6 is a view showing the configuration of a printing apparatus according to another embodiment of the disclosure.

The controller 140 may control the output of the light-absorbing composition and the color-variable composition through the first discharger 120 and the second discharger 130, or may control curing units 500 and 610 or an energy generator 6006 of FIGS. 5 and 6. The curing units 500 and 610 or the energy generator 600 will be described with reference to FIGS. 5 and 6. Hereinafter, a method in which the controller 140 controls discharge time points of the first discharger 120 and the second discharger 130 will be described.

The controller 140 may control discharge start time points and/or discharge end time points of the first discharger 120 and the second discharger 130 differently. When the first discharger 120 and the second discharger 130 output the light-absorbing composition and the color-variable composition, respectively, at the same time, an area in which a light-absorbing layer 210 or a color-variable layer is not present may occur at a print start position and a print end position. For example, when the first discharger 720 and the second discharger 730 start discharge operations at the same time in the printer head where the first discharger 720 and the second discharger 730 are located in parallel as shown in FIG. 7, an area in which only a color-variable layer is present without a light-absorbing layer may occur at a print start position, and an area in which only a light-absorbing layer is present without a color-variable layer may occur at a print end position.

Therefore, the controller 140 may control the second discharger 130 to output a color-variable composition after a certain or predetermined or calculated period of time (e.g., a time until the printer head of FIG. 7 moves and the second discharger 730 reaches the discharge start position of the first discharger 720) has elapsed after the first discharger 120 outputs a light-absorbing composition. In addition, the controller 140 may control the second discharger 130 to terminate the output of the color-variable composition after a certain or pre-determined or calculated period of time (e.g., a time until the printer head of FIG. 7 moves and the second discharger 730 reaches the discharge end position of the first discharger 720) has elapsed after the first discharger 120 terminates an output. The aforementioned period of time may be predetermined by e.g. assuming a predefined writing speed and may be calculated by providing the printing apparatus with sensors measuring the translation of the first/second dischargers over the writing substrate. The controller 140 may than calculate the appropriate time for the second discharger 130, 730 to start discharging (and stop outputting) the color-variable composition.

FIG. 2 is a view showing an example of a cross-section of a printed matter printed by a printing method according to an embodiment of the disclosure.

Referring to FIG. 2, the printed matter includes a light-absorbing layer 210 and a color-variable layer 220 on a print medium 200. A light-absorbing composition is first applied or adsorbed on a print medium to form the light-absorbing layer 210, and then a color-variable composition is applied or adsorbed thereon to form the color-variable layer 220. The print medium 200 may be various media used for conventional printing, such as paper and cloth.

Figure 3:
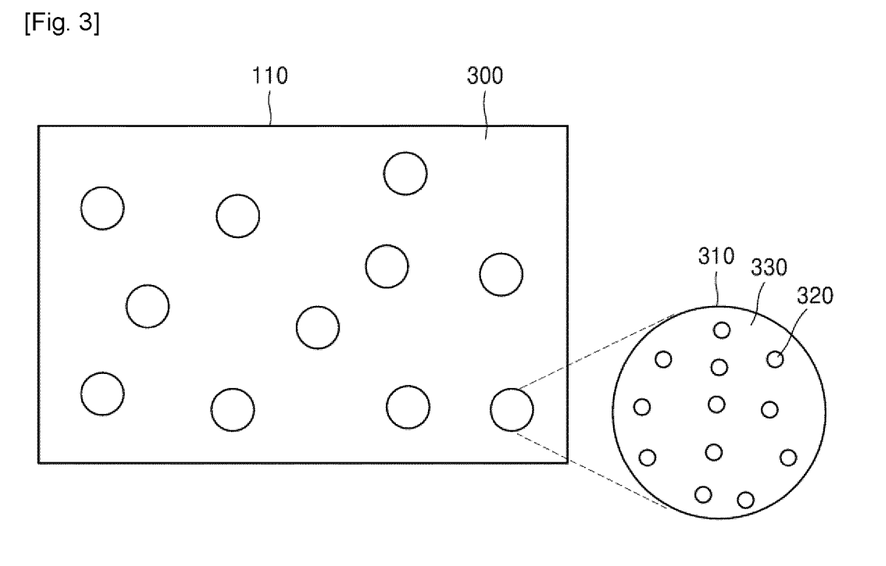
FIG. 3 is a view showing an example of a color-variable composition of a second cartridge according to an embodiment of the disclosure.
Figure 4:
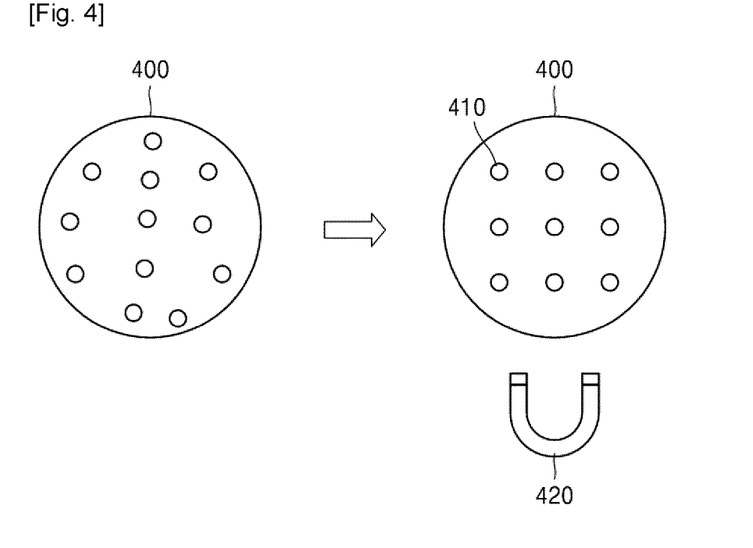
FIG. 4 is a view showing an example of applying a magnetic field to a color-variable composition according to an embodiment of the disclosure.

As will be seen again in FIGS. 3 and 4, the color-variable layer 220 expresses various colors by using a characteristic in which the wavelength of light reflected from a microcapsule is changed according to the arrangement of microparticles in the microcapsule or the distance between the microparticles. However, when light reflected by the print medium 200 and light reflected by a microcapsule of the color-variable layer 220 are mixed, a color which the color-variable layer 220 is originally intended to represent may not appear or visibility may be deteriorated.

Accordingly, the printed matter according to the present embodiment includes a light-absorbing layer 210, which is capable of absorbing light, between the print medium 200 and the color-variable layer 220. The light-absorbing layer 210 not only absorbs light transmitted through the color-variable layer 220 to the print medium 200 but also absorbs light reflected by the print medium 200. Therefore, the visibility of the color-variable layer 220 may be increased by reducing the light reflected by the print medium 200. In addition, the light-absorbing layer 210 may be formed using a black-based pigment or a color pigment having a high contrast with the color of the color-variable layer 220 to increase the visibility of the color-variable layer 220.

In an embodiment, in order to prevent each composition of the light-absorbing layer 210 and the color-variable layer 220 from mixing when forming the light-absorbing layer 210 and the color-variable layer 220, the light-absorbing composition may include an oil-base material and the color-variable composition may include an aqueous material. Or vice versa, the light-absorbing composition may include an aqueous material, and the color-variable composition may include an oil-base material. Alternatively, one of the light-absorbing composition and the color-variable composition may include an oil-based material, and the other may include a neutral material.

FIG. 3 is a view showing an example of a color-variable composition of a second cartridge 110 according to an embodiment of the disclosure.

Referring to FIG. 3, the color-variable composition of the second cartridge 110 includes a solvent 300 and a plurality of microcapsules 310. In this case, the solvent 300 may include at least one of various conventional polymer materials. According to an embodiment, the solvent 300 may include the same material as a curable solvent 330 of each of the microcapsules 310 to be described later.

The microcapsule 310 includes the curable solvent 330 and at least one microparticle 320. The microcapsule may further include a photopolymerization initiator or a thermal polymerization initiator. The microcapsule 310 may have a spherical shape of about 10 m to about 100 μm. The curable solvent 330 may include a photo-curable resin or a thermo-setting resin. In another embodiment, the curable solvent 330 may include a dispersant to improve the dispersibility of the microparticles 320 in the microcapsule 310. Examples of dispersants include wet dispersants such as BYK-154, BYK-2095, and BYK-9077. It should be understood that the particles dispersed in the microcapsule 310 are small in size and, thus, may be at the boundary of dispersion or suspension and true solution. The present application refers to both "dispersion" and "solution" but, for the purposes of this disclosure, these terms should be construed as being synonymous. Likewise, the present disclosure refers to "solvent", "solved", and "curable solvent" and these terms should be construed as equally encompassing dispersions, suspensions, and dispersed and suspended particles.

The microparticle 320 is a particle having a charge and thus may be affected by a magnetic or electric field. The microparticle 320 may include a single metal or different types of metals, or may include oxide or nitride. For example, the microparticle 320 may include a compound such as oxide or nitride including at least one of elements such as iron (Fe), cobalt (Co), nickel (Ni), silicon (Si), titanium (Ti), barium (Ba), strontium (Sr), lead (Pb), aluminum (Al), copper (Cu), silver (Ag), gold (Au), tungsten (W), molybdenum (Mo), zinc (Zn), and zirconium (Zr), or may include a polymer material.

FIG. 4 is a view showing an example of applying a magnetic field to a color-variable composition according to an embodiment of the disclosure.

Referring to FIG. 4, when a magnetic field 420 is applied to a microcapsule 400, the arrangement of microparticles 410 or the distance therebetween changes. For example, when a magnetic field is applied to the microcapsule 400, the microparticles 410 in the microcapsule 400 move and are arranged, and when the direction of the magnetic field applied to the microcapsule 400 changes, the arrangement direction of the microparticles 410 changes. In addition, the distance between the microparticles 410 may vary depending on the strength of the magnetic field applied to the microcapsule 400. The wavelength of light reflected by the microcapsule 400 varies depending on the arrangement of the microparticles 410 or the distance therebetween, and thus a color indicated by the color-variable composition may vary. The effect is described in more detail in e.g. WO 2019/193169 A1. It should also be understood that the microparticles is used to refer to very small sizes not only on the micro-scale but also includes nano-sized particles.

In the present embodiment, the magnetic field 420 is used as a method for adjusting the arrangement of the microparticles 410 in the microcapsule 400 or the distance between the microparticles 410. However, an electric field may be used as the method by the same principle.

FIG. 5 is a view showing the configuration of a printing apparatus according to another embodiment of the disclosure.

Referring to FIG. 5, the printing apparatus further includes a curing unit 500 compared to the printing apparatus of FIG. 1. In addition, a light-absorbing composition in a first cartridge 100 includes a curable solvent.

When the light-absorbing composition is discharged to a print medium through a first discharger 120, the curing unit 500 emits light energy, thermal energy or chemical energy to cure the light-absorbing composition. For example, when the printing apparatus is implemented as a part of the printer head as shown in FIG. 7, the curing unit 500 emits light or heat in a direction toward a print medium 750 from the first discharger 720 to cure a light-absorbing composition 752 discharged onto the print medium 750.

FIG. 6 is a view showing the configuration of a printing apparatus according to another embodiment of the disclosure.

Referring to FIG. 6, the printing apparatus further includes an energy generator 600 and a curing unit 610 compared to the printing apparatus of FIG. 1. The energy generator 600 applies a magnetic field or an electric field to a microcapsule included in a color-variable composition.

The energy generator 600 may control the arrangement of the microparticles in the microcapsule or the distance between the microparticles by adjusting the intensity or direction of the magnetic field or the electric field. For example, the energy generator 600 may include a plurality of elements 740 or 840 for generating a magnetic field or an electric field around a second discharger 730 or 830, as shown in FIG. 7 or 8, and may control the arrangement of the microparticles or the distance between the microparticles by adjusting the intensity and/or direction of a magnetic or electric field generated by each of the elements 740 or 840.

The curing unit 610 cures a curable solvent of the microcapsule. The curing unit 610 may output light energy, thermal energy, chemical energy, or a combination thereof depending on the type of the curable solvent. The curing part 610 fixes the color of the color-variable composition by fixing the arrangement of the microparticles in the microcapsule or the distance between the microparticles.

The energy generator 600 and the curing unit 610 may fix the arrangement of the microparticles or the distance therebetween such that the color-variable composition exhibits a certain or pre-determined color before the color-variable composition is applied or adsorbed on a print medium (i.e., before the color-variable composition is discharged onto the print medium), and the second discharger 130 may discharge the color-variable composition fixed in a certain or predetermined color onto the print medium.

In another embodiment, after the second discharger 130 discharges the color-variable composition onto the print medium, the energy generator 600 and the curing unit 610 may fix the arrangement of the microparticles or the distance between the microparticles such that the color-variable composition present in the print medium exhibits a certain or pre-determined color.

FIG. 7 is a view showing an example of a printer head in which a printing apparatus according to an embodiment of the disclosure is implemented.

Referring to FIG. 7, the printer head includes a first discharger 720 for discharging a light-absorbing composition 700 and a second discharger 730 for discharging a color-variable composition 710. The first discharger 720 and the second discharger 730 may respectively output the light-absorbing composition 700 and the color-variable composition 710 in the form of droplets.

The printer head may include an energy generator 740 for changing the color of the color-variable composition 710, and may further include a curing unit (not shown) that cures a curable solvent in a microcapsule to fix the arrangement of microparticles of the color-variable composition 710 and the distance between the microparticles.

The light-absorbing composition 700 is first output to a print medium 750 to form a light-absorbing layer 752, and then the color-variable composition 710 is output thereon to form a color-variable layer 754. As shown in FIG. 1, the first discharger 720 may be located in front of the second discharger 730 based on the traveling direction of the printer head.

In another embodiment, the first discharger 720 may be implemented to be movable. For example, the first discharger 720 may be implemented to move along a circle around the second discharger 730, and the controller 140 may move the position of the first discharger 720 such that the first discharger 720 is located in front of the second discharger 730 according to the travelling direction of the printer head.

FIG. 8 is a view showing an example of a pen in which a printing apparatus according to an embodiment of the disclosure is implemented.

Referring to FIG. 8, the pen includes a first cartridge 800, a second cartridge 810, a first discharger 820 and a second discharger 830. The first discharger 820 and the second discharger 830 output respective compositions through end portions contacting a print medium, and the respective compositions are applied or adsorbed on the print medium. End portions of the first discharge portion 820 and the second discharge portion 830 may be embodied in a form that is the same as or similar to that of a tip portion of a ballpoint pen or fountain pen.

When the first discharger 820 and the second discharger 830 are arranged in parallel, a user may hold and use the pen such that the first discharger 820 is positioned in front of the pen's traveling direction, and thus, a light-absorbing layer 852 and a color-variable layer 854 may be sequentially stacked on a print medium 850. An example in which the light-absorbing layer 852 and the color-variable layer 854 are sequentially stacked even when the user holds and uses the pen in any direction is illustrated in FIG. 9.

FIG. 9 is a view showing an example of the configuration of a discharger according to an embodiment of the disclosure.

Referring to FIG. 9, a first discharger 900 has a form surrounding a second discharger 910. Therefore, regardless of a direction in which the pen is held and used, a light-absorbing composition is first output to a print medium 920 by the first discharger 900, and then a color-variable composition is output by the second discharger 910.

Figure 10:
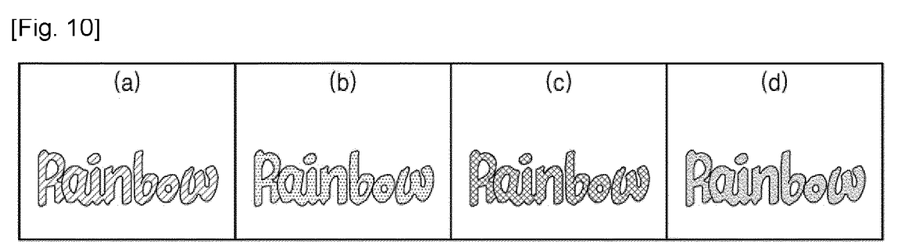
FIG. 10 is a view showing an example of printed matter printed by a printing method according to an embodiment of the disclosure.

FIG. 10 is a view showing an example of printed matter printed by a printing method according to an embodiment of the disclosure.

FIG. 10 shows the printed matter of different colors in different patterns.

Referring to FIG. 10, printed matter printed with different arrangements of or different distances between microparticles in microcapsules of a color-variable composition are illustrated. Different colors appear depending on the arrangement of the microparticles or the distance between the microparticles. The colors of the printed writing in FIG. 10 are—left to right—red, brown, green and blue.

Figure 11:
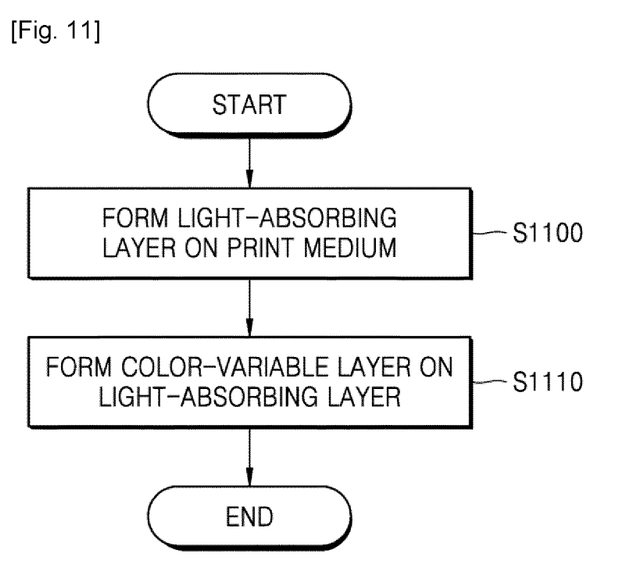
FIG. 11 is a flowchart illustrating an example of a printing method according to an embodiment of the disclosure.

FIG. 11 is a flowchart illustrating an example of a printing method according to an embodiment of the disclosure.

Referring to FIGS. 1 and 11, the controller 140 of the printing apparatus controls the first discharger 120 to spray a light-absorbing composition on a print medium and form a light-absorbing layer (operation S1100). Then, the controller 140 controls the second discharger 130 to spray a color-variable composition on the light-absorbing layer formed on the print medium and form a color-variable layer (operation S1100).

A printing method according to an embodiment of the disclosure may be embodied as a computer-readable code on a computer-readable recording medium. The computer-readable recording medium is any data storage device for storing data which can be thereafter read by a computer system. Examples of computer-readable recording media include read-only memory (ROM), random-access memory (RAM), compact disc (CD)-ROMs, magnetic tapes, floppy disks, optical data storage devices, etc. The computer-readable recording media may also be distributed over network-coupled computer systems so that computer-readable codes are stored and executed in a distributed fashion.

According to one or more embodiments of the disclosure, a plurality of colors may be printed using one cartridge. In addition, it is possible to increase visibility by suppressing light reflected from a print medium.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the scope of the disclosure as defined by the following claims.

The present disclosure further relates to the following list of embodiments:

1. A printing apparatus comprising:
   a first cartridge including a light-absorbing composition;
   a second cartridge including a color-variable composition;
   a first discharger that discharges the light-absorbing composition included in the first cartridge; and
   a second discharger that discharges the color-variable composition included in the second cartridge.
2. The printing apparatus of clause 1, wherein the second discharger discharges the color-variable composition of the second cartridge onto a light-absorbing layer including the light-absorbing composition.
3. The printing apparatus of clause 1 or clause 2, wherein the first discharger is located in front of the second discharger based on a printing direction.
4. The printing apparatus of clause 1 or clause 2, wherein the first discharger is present around the second discharger.
5. The printing apparatus of any one of clauses 1 to 4, wherein the light-absorbing composition includes any one of an oil-based material, an aqueous material, and a neutral material, and the color-variable composition includes any one of an oil-based material, an aqueous material, and a neutral material.
6. The printing apparatus of any one of clauses 1 to 5, wherein the light-absorbing composition includes a curable material, and the printing apparatus further comprising a curing unit that emits heat or light for curing the curable material.
7. The printing apparatus of any one of clauses 1 to 6, wherein the light-absorbing composition includes a black-based pigment, and the color-variable composition includes at least one microcapsule, wherein the at least one microcapsule includes microparticles in which one or more particles having charges are dispersed, and a curable solvent.
8. The printing apparatus of any one of clauses 1 to 7 and in particular of clause 7, further comprising:
   an energy generator that applies an electric field or a magnetic field to the at least one microcapsule; and
   a curing unit that cures the curable solvent of the at least one microcapsule.
9. A printing method using a printing apparatus, the printing method comprising:
   spraying a light-absorbing composition to form a light-absorbing layer on a print medium; and
   spraying a color-variable composition on the light-absorbing layer to form a color-variable layer.
10. The printing method of clause 9, wherein the spraying of the color-variable composition comprises:
    applying a magnetic field or electric field for arranging microparticles included in the color-variable composition in a certain direction;
    applying thermal energy, light energy, or chemical energy to cure a curable solvent included in the color-variable composition; and
    discharging a cured color-variable composition after the microparticles are arranged in a certain direction.
11. Printed matter comprising:
    a print medium;
    a light-absorbing layer including a light-absorbing material on the print medium; and a color-variable layer including a color-variable composition on the light-absorbing layer.

What is claimed is:
1. A printing apparatus comprising:
a first cartridge including a light-absorbing composition;
a second cartridge including a color-variable composition;
a first discharger configured to discharge the light-absorbing composition included in the first cartridge onto a print medium;
a second discharger configured to discharge the color-variable composition included in the second cartridge onto the print medium at a same time as the light-absorbing composition;
a third discharger configured to discharge the light-absorbing composition included in the first cartridge onto the print medium and positioned on a first side of the second discharger;
a fourth discharger configured to discharge the light-absorbing composition included in the first cartridge onto the print medium and positioned on a second side of the second discharger adjacent to the first side; and a fifth discharger configured to discharge the light-absorbing composition included in the first cartridge onto the print medium and positioned on a third side of the second discharger opposite to the second side, wherein the first discharger is positioned on a fourth side of the second discharger adjacent to the second side and opposite to the first side, and wherein the first discharger, the third discharger, the fourth discharger, and the fifth discharger are configured and/or controlled to discharge the light-absorbing composition included in the first cartridge when located in front of the second discharger based on a printing direction.

2. The printing apparatus of claim 1, wherein the second discharger is configured and/or controlled to discharge the color-variable composition of the second cartridge onto a light-absorbing layer including the light-absorbing composition.

3. The printing apparatus of claim 1, wherein the first discharger is located in front of the second discharger based on a printing direction.

4. The printing apparatus of claim 1, wherein the light-absorbing composition includes any one of an oil-based material, an aqueous material, and a neutral material, and the color-variable composition includes any one of an oil-based material, an aqueous material, and a neutral material.

5. The printing apparatus of claim 1, wherein the light-absorbing composition includes an oil-based material and the color-variable composition includes an aqueous material.

6. The printing apparatus of claim 1, wherein the light-absorbing composition includes an aqueous material and the color-variable composition includes an oil-based material.

7. The printing apparatus of claim 1, wherein the light-absorbing composition includes a curable material, and the printing apparatus further comprising a curing unit that is configured to emit heat or light for curing the curable material.

8. The printing apparatus of claim 1, wherein the light-absorbing composition includes a black-based pigment, and the color-variable composition includes at least one microcapsule, wherein the at least one microcapsule includes microparticles in which one or more particles having charges are dispersed, and a curable solvent.

9. The printing apparatus of claim 8, further comprising:
an energy generator configured to apply an electric field or a magnetic field to the at least one microcapsule; and
a curing unit that is configured to cure the curable solvent of the at least one microcapsule.

10. The printing apparatus of claim 1, wherein the printing apparatus further comprises a controller configured to control the first discharger to spray the light-absorbing composition on the print medium under formation of a light-absorbing layer, followed by the controller controlling the second discharger to spray the color-variable composition on the light-absorbing layer formed on the print medium under formation of a color-variable layer.

11. The printing apparatus of claim 1, wherein the printing apparatus is a handheld-writing instrument and in particular a pen.

12. A printing method using the printing apparatus of claim 1, the printing method comprising:
spraying the light-absorbing composition to form a light-absorbing layer on the print medium from a start position to an end position over a period of time; and
spraying the color-variable composition on the light-absorbing layer to form a color-variable layer from the start position to the end position over at least a portion of the period of time.

13. The printing method of claim 12, wherein the spraying of the color-variable composition comprises:
applying a magnetic field or electric field for arranging microparticles included in the color-variable composition in a pre-determined direction;
applying thermal energy, light energy, or chemical energy to cure a curable solvent included in the color-variable composition; and
discharging a cured color-variable composition after the microparticles are arranged in a pre-determined direction.

* * * * *